United States Patent Office

3,834,946
Patented Sept. 10, 1974

3,834,946
METHOD OF MAKING A STORAGE BATTERY
Robert F. Amlie, Milwaukee, and Eugene Yehuda Weissman, Glendale, Wis., assignors to Globe-Union Inc.
No Drawing. Filed July 12, 1972, Ser. No. 271,169
Int. Cl. H01m 1/00
U.S. Cl. 136—176                                      5 Claims

ABSTRACT OF THE DISCLOSURE

A charged storage battery having good shelf life and activation performance characteristics upon the addition of electrolyte is made by forming the battery in the usual manner in forming electrolyte, permitting the formed plates to stand in the forming acid while boosting the plates with an electrical charge, removing the electrolyte from the formed storage battery, and filling the battery with water. The water can be left in the storage battery and the battery stored or shipped in this manner. In a preferred manner, the water is removed from the battery after standing in it for approximately 5 minutes to 1 hour, the negative plates are passivated by introducing oxygen into the storage battery, and then the battery is sealed, stored and/or shipped.

CROSS REFERENCE TO RELATED APPLICATIONS

None.

BACKGROUND OF THE INVENTION

This invention relates to a method of producing storage batteries and, more particularly, to a method of fabricating lead acid storage batteries having a high charge rate after storage which method obviates many of the prior art problems in forming and processing plates so as to retain a charged state during storage.

In recent years, it is customary in battery production, to charge the battery at the source of manufacture, ship it to a distributor or retailer without electrolyte and then activate the battery by the mere addition of electrolyte. With this procedure, many of the problems usually associated with the maintenance and aging of fully charged, wet batteries stored in inventory are eliminated. However, the manufacture of dry charge storage batteries creates economic and technical problems in the processing such as washing and drying of the plate assemblies after they have been charged or formed. Several prior art techniques have been required to accomplish subsequent procedures for battery activation so as to effect a full charge of the battery upon addition of the electrolyte. For example, in U.S. Pat. 2,880,520 heated air is used to dry the plates and an extremely high velocity stream is used. Such drying techniques are costly and time consuming because high velocity air must be used in large quantities and for extended periods of time. This is due to the fact that it was thought necessary to remove all residual moisture from the plates. U.S. Pat. 3,314,158 is a further example of such air drying procedure. In U.S. 1,468,259 a procedure is indicated for producing dry charge batteries where after a forming procedure, the plates are washed several times and after the last washing step all of the water is drained from the cells.

It is an object of the present invention to provide a novel method for manufacturing a dry charged battery wherein the requirement for thorough washing and complete drying of the plates is eliminated. It is another object of this invention to provide a dry charged storage battery which has good shelf life and activation characteristics. It is still another object of the present invention to provide a method for producing a storage battery which will retain its charged state wherein the method is inexpensive and can be accomplished without the need for additional investment in capital equipment or special handling techniques. It is yet another object of this invention to provide for manufacturing storage batteries having good activation characteristics wherein exacting procedures for removal of the electrolyte are eliminated.

SUMMARY OF THE INVENTION

The foregoing objects are accomplished and the shortcomings of the prior art are overcome by the present process for producing a fully charged battery capable of being activated by the addition of electrolyte wherein forming electrolyte is added to a cell compartment containing the battery element and the element is allowed to stand in the forming electrolyte with the plates subjected to a boost charge. The electrolyte is then removed from the battery container and container is subsequently filled with water. If desired, the battery can be stored or shipped in this condition or the water can be removed after a period of about one minute to one hour by merely dumping the water from the battery passivating the negative plates by introducing air into the container, and then sealing the container for shipment and storage.

DESCRIPTION OF THE PREFERRED EMBODIMENTS

The battery utilized in this process initially is of the conventional multicell container type having a plurality of partition walls welded integrally with the container to form cell compartments. Battery elements are of conventional design, including positive and negative plates alternatively arranged with suitable separators and straps of opposite polarity connected electrically to the respective positive and negative plates of each element which are installed into the cell compartments. The elements in the end cell compartments are provided with terminal posts which extend either upwardly through the battery cover or through an outside container wall for external electrical connection in the circuit in which the battery is to be used. The straps connecting the respective positive and negative plates of each element are provided with upstanding connector lugs. Straps and connector lugs are cast to the plates by any suitable method and apparatus, such as that described generally in U.S. Pats. 3,087,005 and 3,253,306 or by gas burning methods.

After the elements are installed into the cell compartments, the postive plates of one element are electrically connected to the negative plates of the element located in the adjacent cell by joining the respective connector lugs in a conventional manner, preferably by joining the connector lugs together in an aperture in the partition, such as by the method generally described in U.S. Pat. 3,313,658.

After the intercell connections have been made, the battery is then formed or charged in a conventional manner. Preferably, this step is performed without the cover installed and bonded onto the container; however, it is within the scope of this invention to install and seal the cover onto the container prior to the forming step. The cell compartments are filled with conventional forming battery electrolyte, e.g., sulfuric acid having a specific gravity of 1.100, and the battery is connected in a charging circuit, generally in series with a number of other batteries. The batteries are then fully charged and after formation a high current discharge test can be run to determine the integrity of the internal electrical connections. After formation is complete, the elements are allowed to stand in the forming acid for a period of time sufficient for some self-discharge in a finite amount of the positive plates and then a boost charge is applied to the battery elements. After the boost charge, the electrolyte acid is removed by dumping it from the battery container and the battery is then filled with water. If desired, the battery can be stored in this condition and with vent caps applied to prevent the water from evaporating. If it is not desired to ship the battery with the water in it, the water can remain standing in the battery for approximately five minutes to about one hour and then be dumped from the battery. Air is then introduced into the container to passivate the negative plates. The battery is then subsequently sealed and ready for storage or shipment.

The previously indicated passivation step is best accomplished by following the procedure set forth in a patent application assigned to the assignee of this application which application is entitled "Process and Apparatus for Reduction of Pressure Build-Up in Batteries" filed June 14, 1972, Ser. No. 262,769. An air diffusion method as well as a forced air process is described in that patent application wherein air is permitted to diffuse into the battery and the negative plate by exposing the plates to ambient air for a period of two to six hours or is forced in either by blowing or the use of compressed air for a period of one and one half to ten minutes.

The following examples are presented to more fully set forth the invention but are not to be construed as limiting the present invention to the precise conditions, procedures, or materials set forth.

EXAMPLE I

Two type 24C, 60 ampere-hour automotive batteries are filled with forming acid of a specific gravity of 1.090–1.095 and charged for 19 hours at a charging rate of 7.8 amps. After the 19 hour period, the batteries were permitted to remain with the electrolyte acid in them for a period of 72 hours so as to effect a finite discharge after which they were boosted at 5 amps for two hours. The electrolyte is then removed from the battery by dumping it and the battery drained in an upside-down position for about five minutes. After the draining, the battery is filled with water and left standing for one minute. After the water soaking step, the water is dumped from the battery and the battery is then sealed with suitable sealing caps. The battery is now ready for storage and/or shipment.

EXAMPLE II

This example illustrates the shelf life and charge characteristics of the batteries produced in accordance with the teachings of Example I.

One of the batteries stored at 120° F. for two days and exposed to the atmosphere for one hour to partially oxidize the negative plates is stored for one month at 120° F. in a sealed condition. When tested in an open circuit, it maintained a voltage in excess of one volt per cell for 3.72 minutes at 150 amps with a battery temperature of 30° F. Another battery stored in the same manner as the first and also partially oxidized, after a storage period of 3.5 months held a one volt per cell discharge for 1.04 minutes. For these batteries the first had a specific gravity for the electrolyte of 1.223 and the second 1.219 when activating acid of 1.265 is added to the batteries for effecting a charged condition.

It should be pointed out that two additional batteries processed in accordance with the steps and conditions stated in Example I, as well as being subjected to the storage conditions and oxidation treatment indicated for the first two batteries, except utilizing a 15 minute period for the water retention, failed to produce a workable battery because of excessive pressures with consequent cracking of the battery case-to-cover joint. This exposed the negative plates to air with a resulting loss of charge. The pressure build-up can now be prevented by employing the previously indicated passivation step wherein a controlled amount of oxygen is introduced into the cells such as by exposure to air for two to six hours or by blowing air or the use of compressed air according to the conditions set forth in the previously identified patent application.

EXAMPLE III

A battery such as that described in Example I is formed and drained of electrolyte by centrifuging under the conditions stated in U.S. 3,652,341. It is then filled with water and the water filled battery stored and/or shipped to its destination. The battery can be sealed if desired with a sealing cap so as to avoid vaporization loss of the water. When it is desired to activate the battery, the water is merely dumped from it and activated by the addition of activating electrolyte.

EXAMPLE IV

When the battery produced in accordance with Example III was tested after 328 days storage at room temperature, it required approximately 5½ minutes before dropping below the one volt minimum per cell discharge test as described in Example II. At 406 days at room temperature, a one volt per cell discharge was maintained for approximately 5¼ minutes.

It will be noted in Example III that the battery was drained of electrolyte by centrifuging. This is not necessary and the same benefits derived from filling the battery with water can be obtained without removing that additional amount of forming electrolyte which will not drain by means of gravity flow.

In the previous procedures stated in Examples I and III, it should be pointed out that depending upon the timing of each processing step and the amount of water which is dumped from the respective batteries the specific gravity of the activating electrolyte will preferably be higher than the standard specific gravity of 1.265 in order to result in batteries possessing the normally required specific gravity of 1.265.

In the previous Example I a period of five minutes is indicated for draining the electrolyte from the battery prior to the negative passivation step. It should be pointed out that this period of time can range from a minimum of about two minutes for as long as ten minutes. Concerning the filling of the battery with water and then dumping the water from it, a period of time of about one minute is indicated in Example I for water retention. This also can vary from a minimum of about one minute to as long as about one hour and the air passivation step step can vary in time from about one and one half to ten minutes if the air is formed into the battery or from about two to six hours if the battery is exposed to ambient air and the oxygen is permitted to diffuse into the negative plates. Further, the examples indicate a procedure wherein the plates are secured inside the battery container during the various processing steps. It is not necessary that they be so and they could be formed and processed in accordance with the procedures of this invention outside the battery container.

It will thus be seen that through the present invention there is now provided a process for manufacturing charged batteries having long storage life and high recharge capabilities wherein the drying step previously thought to be required is eliminated. The process of this invention can be utilized by using simple mechanical procedures and without requiring large capital expenditures. No precise determinations need be made in determining when the process is complete and it can be accomplished without the need for highly trained personnel. The process is effected in a fast manner and with a minimum amount of steps.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:
1. A method of producing a fully charged battery capable of being activated by the addition of electrolyte which battery comprises a container having at least one cell compartment and at least one battery element composed of a plurality of positive and negative plates with separators disposed between the plates including the steps: adding forming electrolyte to said cell compartment, forming said battery element, allowing said battery element to stand in said forming electrolyte for a period of time sufficient for the postive plates to self-discharge a finite amount, boosting said battery element, removing a major portion of the electrolyte from said container, filling said container containing said plates with water, removing said water from said container, passivating said negative plates by contacting said plates with oxygen and subsequently sealing said container.

2. The method as defined in claim 1 wherein said electrolyte is removed by means of centrifuging.

3. The method as defined in claim 1 wherein said water is permitted to remain in said container for a period of about one minute to about one hour prior to being removed.

4. The method as defined in claim 1 wherein said introduction of oxygen to passivate said negative plate is accomplished by blowing air into said container.

5. The method as defined in claim 4 wherein said air blowing is accomplished during a period of about one and one half to about ten minutes.

References Cited
UNITED STATES PATENTS

| | | | |
|---|---|---|---|
| 3,652,341 | 3/1972 | Halsall et al. | 136—176 |
| 1,737,039 | 11/1929 | Benner et al. | 136—176 |
| 1,716,320 | 6/1929 | Pearson | 136—33 |
| 1,468,259 | 9/1917 | Carpenter | 136—176 |

DONALD L. WALTON, Primary Examiner